Feb. 24, 1959    H. THOMA    2,874,591
DRIVE FOR TRACK-LAYING

Filed Aug. 31, 1954    3 Sheets-Sheet 1

INVENTOR.
HANS THOMA
BY

Feb. 24, 1959  H. THOMA  2,874,591
DRIVE FOR TRACK-LAYING
Filed Aug. 31, 1954  3 Sheets-Sheet 3

INVENTOR:
HANS THOMA
BY

United States Patent Office 2,874,591
Patented Feb. 24, 1959

2,874,591

DRIVE FOR TRACK-LAYING VEHICLES

Hans Thoma, Balsthal, Switzerland

Application August 31, 1954, Serial No. 453,296

6 Claims. (Cl. 74—720.5)

This invention relates to drives, and especially to variable drives for track-laying vehicles.

Most track-laying vehicle drives use, in addition to a multiple-stage speed gear which is driven directly from the flywheel of the engine possibly with a friction clutch, two planetary gears, generally in the form of internal rim gears. The two internal gears are driven together from the distributing shaft of the speed gear, the planetary gear carriers are connected one to each track, generally with the interposition of an intermediate gear, and the sun gears are locked by brakes for the forward movement of the vehicle. When such a brake is released, the track concerned is first decoupled from the drive. When the decoupled track is then braked by a so-called steering brake, it is locked and the vehicle is forced into a turn.

It is also commonly known to employ planetary drives or gears, which are also described as superposing gears and are likewise usually found in pairs, but with the difference that after one track has been decoupled and braked it does not stop completely but continues to be driven at a reduced speed, whereby the proportion of energy consumed in steering is diminished. On the other hand, the vehicle cannot turn by using one track as a fulcrum but can only proceed in fairly wide curves.

In accordance with the invention and paying due attention to the favourable running properties of these known superposing control drives, a substantial simplification and further improvement is achieved by the fact that the superposing gears are simultaneously utilized, in conjunction with one or two regulating gears of known type, for both speed-changing and steering. The superposing gears being preserved, the neutral shaft is eliminated and instead the sun gears or, generally, the corresponding shaft extensions of the two superposing gears are each driven with a hydraulic regulating gear, the primary part of which is on the vehicle's motor. The main speed gear can be omitted, or it can be limited to a small number of stages because in this embodiment with the two regulating gears not only can a certain difference in the travelling speed of the tracks be achieved but the said tracks can also be made to advance or reverse just as required, thus enabling the speed gear to be completely or almost completely dispensed with.

In the drive system according to the invention, none of the motor output is transformed at average speeds, and at the most half the output at the highest travelling speeds. Connected therewith is a substantial reduction of the losses since, especially at average speeds, the hydraulic losses become very small and the efficiency of the drive at these speeds, which are the most important in practice, becomes as high as when a simple intermediate or reducing gear is used; i. e. an efficiency of 95 percent can easily be attained.

It is, therefore, a principal object of the present invention to provide means facilitating driving of a track-laying vehicle in a highly efficient manner and with substantial reduction of power and energy losses during the operation of said vehicle.

It is another object of the present invention to provide means affording a greatly simplified, yet highly efficacious variable-speed drive for track-laying vehicles, such as tractors, tanks, bulldozers, and the like, said drive employing a number of mechanical and hydraulic gears which function jointly and simultaneously both for steering and speed-changing purposes.

Still another object of the present invention is the provision of means contributing to a novel and improved drive mechanism for an automotive vehicle supported on tracks, said mechanism being designed and constructed to enable the direction as well as the speed of movement of each of the tracks of said vehicle to be individually controlled with a high degree of accuracy, whereby the radius of turning of said vehicle may be reduced to a minimum and the maneuverability of the vehicle correspondingly increased.

These and other objects of the invention will become further apparent from the following detailed description, reference being made to the accompanying drawings, showing preferred embodiments of the invention.

Figure 1:
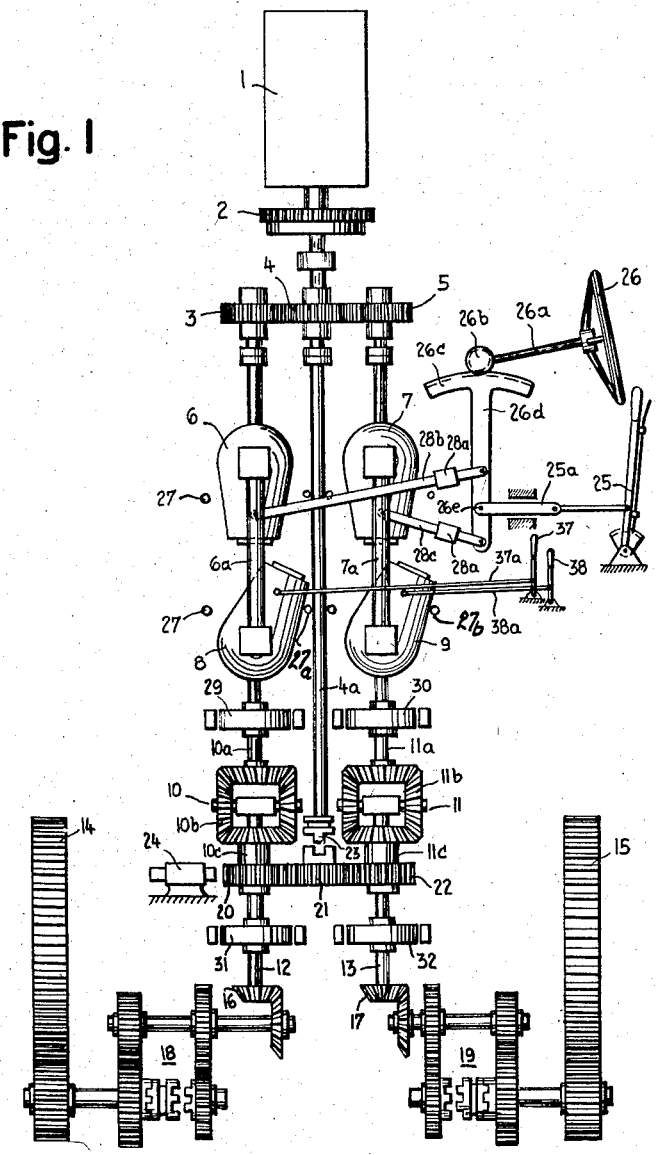
Fig. 1 is a schematic and diagrammatic view of one type of drive mechanism for track-laying vehicles constructed in accordance with the present invention.

Referring now more particularly to Fig. 1, the primary parts 6 and 7 of two adjustable hydraulic or variable ratio transmissions of the piston type, for example, as shown in British Patent No. 633,619, are first driven from an engine such as motor 1 with the flywheel 2 via drive shaft 4a and gear wheels 3, 4 and 5. The secondary parts 8 and 9 of said transmissions, respectively, drive shaft extensions 10a, 11a of the two superposing gears 10 and 11, which are designed by way of example in the form of known bevel differential gears. The primary parts 6 and 7 are hydraulically connected with the secondary parts 8 and 9, respectively, over conduits 6a and 7a, respectively. The distributing shafts 12 and 13, which drive the tracks 14 and 15 in known manner via the bevel gears 16, 17 and the intermediate or reducing gear system 18, 19, which, by way of example, are of a two-stage type in Fig. 1, are connected to the planetary wheels 10b, 11b of the superposing gears 10 and 11. The shaft extensions 10c, 11c can also be driven, if required, from the motor shaft 4a via the constant ratio transmission gear wheels 20, 21 and 22 and jaw-clutch 23 with its associated shaft, or the distributing shafts 12, 13 can also be locked by means of the ratchet-tooth locking or stopping means 24.

The mode of operation of this gear system is as follows:

When the jaw-clutch 23 is engaged and the primary parts or variable ratio transmission means 6 and 7 are in their central neutral or inoperative position, the secondary parts 8 and 9 are hydraulically braked upon actuation of speed control levers 37, 38 so that in this state the motor 1 drives the two distributing shafts 12 and 13 via shaft 4a, using the superposing gears 10, 10a, 10b, 10c and 11, 11a, 11b, 11c as reducing gears and with, as for example in Fig. 1, a constant transmission ratio of 1:2. If then the gear system 18 and 19 is also engaged at a certain stage, preferably both at the same stage, the vehicle will be propelled forward at a certain low speed which will depend on the reduction ratio of the gears 10 and 11. If the primary parts 6 and 7 are then swivelled in the same direction by, say, the speed control lever 25 via links or rods 25a, 28b, 28c and arm 26d, this forward speed will be increased or reduced according to the swivelling movement or position of these primary parts. The vehicle then moves forward at a correspondingly reduced or increased speed; it can also be brought to a halt if the secondary parts 8 and 9 run backwards at an appropriate rate, and it can even be made to reverse at a certain speed if these secondary parts are allowed to run backwards fast enough. If, however, the primary parts 6 and 7 are not swivelled in the same direction, but counter to or away from one another by turning the steering element or wheel 26 and via steering column 26a, pinion 26b, rack 26c, arm 26d and links 28b, 28c, the distributing shafts 12 and 13 will rotate at varying speeds when the jaw clutch 23 is engaged. Thus, according to the invention, the same gearing arrangement which functions as the speed-varying means can be used at the same time for steering, which results in a great simplification. In order to prevent too extensive a swivelling movement of the variable ratio transmission means, particularly in the case of the primary parts 6 and 7, stops 27, 27a, 27b can be used in conjunction with preferably double-acting spring couplings 28a (known per se).

It will be noted that when the steering wheel is rotated, arm 26d will be pivoted about fulcrum 26e at rod 25a.

If the jaw-clutch 23 is disengaged, a sort of idle running state is obtained, in the sense that unless the secondary parts 8 and 9 are moved or swivelled in the appropriate manner by levers 37, 38 via links 37a, 38a, respectively, the vehicle can only advance and reverse in a straight line. If, furthermore, after releasing the jaw-clutch 23, the said gear wheels are locked by the engagement thereof with ratchet tooth device 24 or some similar arrangement forming locking means, the superposing gears 10, 11 merely act as a normal reducing gear with a transmission ratio of 1:2 and then either track can be made to advance or reverse as desired by swivelling the primary parts 6 and 7 by means of speed control level 25 and its associated connecting rods 25a, 28b, 28c; if the secondary parts 8 and 9 are swiveled back at, of course, not too large a stroke, the speed can be still further accelerated. This last-named speed change enables the vehicle to be easily advanced or reversed as well as steered in any direction, turned immediately if required or by a combined slow forward and backward motion. The vehicle is then operated entirely hydraulically, as is the case with already known vehicles. As contemplated according to the invention, the addition of the superposing gear system to the purely hydraulic variable ratio transmission drive means increases the efficiency of the drive, with suitable selection of the transmission ratio, three times or almost twice as efficient if the jaw-clutch 23 and ratchet tooth 24 are omitted and if the operator is content with a slow reverse speed.

A reducing output gear system 18, 19 between the distributing shafts 12, 13 and the tracks drives, as shown in Fig. 1, to provide a cross-country and a road speed, or even three such speeds, has a comparatively small effect since the system of gears seldom needs to be changed or shifted while the vehicle is in motion if the hydraulic drives are chosen large enough.

The invention, of course, is not restricted to the constructional details of the gear arrangement illustrated in Fig. 1. The adjustable transmissions, with regard to the characteristics of the superposing gears 10, 11 especially in the changing of the ratchet tooth 24 and jaw-clutch 23 as illustrated in Fig. 1, are only subjected to a partial stress in continuous running and most of the engine or motor output is generally transmitted purely mechanically via a few gear wheels.

Figure 2:
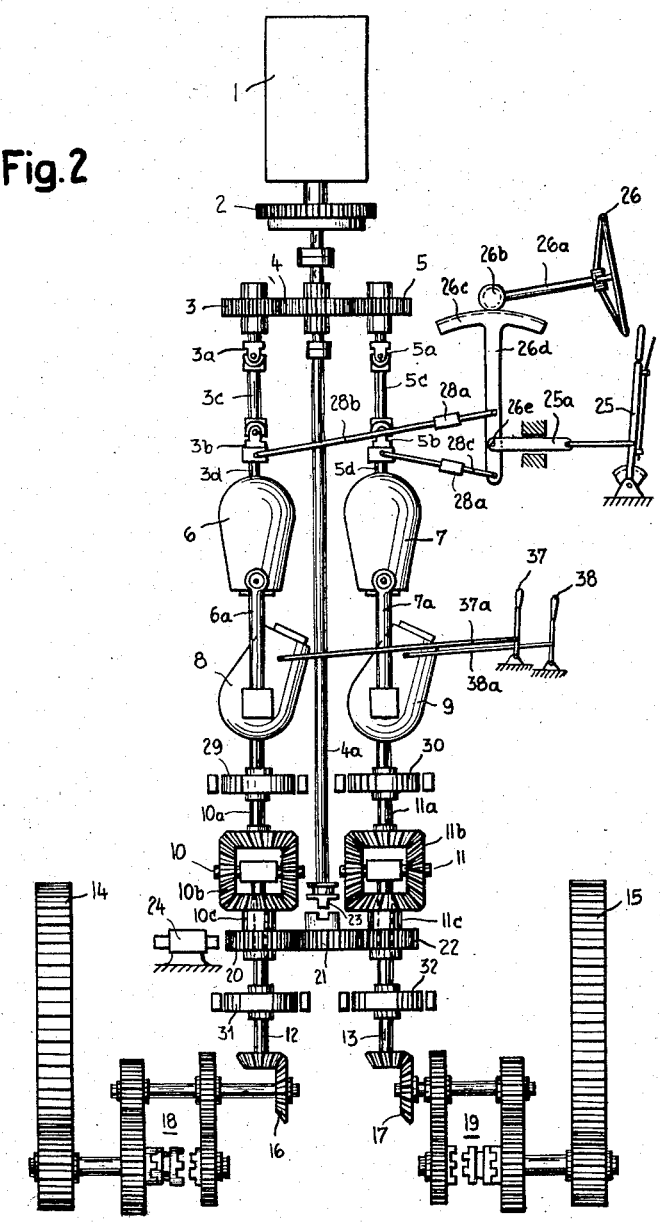
Fig. 2 is a similar view of a modified type of drive mechanism according to the invention.

Referring now to Fig. 2, it may be seen that the adjustable primary parts 6 and 7 can also be designed as axial-piston pumps with fixed housings and with external universal joints 3a, 5a; 3b, 5b between the pistons and the gear shafts instead of as axial piston units with swivelable cylinders (see, for example, Swiss Patent No. 256,308). The same design can be used for the secondary parts 8 and 9 if it is desired, as is not generally the case, to dispense with the adjustment of the latter.

From Fig. 2 it will be noted that the gear wheels 3 and 5 are connected with the fixed-housing primary parts 6 and 7 via universal joints 3a and 5a, shafts 3c and 5c, and universal joints 3b and 5b, respectively. To the latter the links 28b and 28c, respectively, are connected to permit swivelling of the shafts 3d and 5d, respectively, relative to the fixed housings of the primary parts 6 and 7 to thereby vary the displacement of said parts.

If furthermore, the systems of brake discs 29 and 30 are arranged on the secondary shafts 3c, 5c, the latter can be braked to support the action of the secondary parts 8 and 9 in the range of powerful torque development or low travelling speeds when the said parts themselves run backwards. With this aid it is also possible to continue driving even in the event of the adjustable hydraulic transmission 6, 8 or 7, 9 breaking down. In order to steer the vehicle then, these brakes would have to be released, whereby one track would run idle and the corresponding distrbiuting shaft 12 or 13 would have to be braked by another brake 31 or 32. The superposing gears 10, 10b and 11, 11b in Fig. 1 can therefore also be utilized, for instance, as aids for braking or for obtaining a state of idle running.

What is essential is the utilization of the superposing gears 10 and 11, which are, moreover, customary in track-laying drives and which may be regarded kinematically as differential gears, for both the simultaneous steering and speed control of the vehicle instead of the usual separate steering gear and speed control means. Also essential to the invention in its further embodiment is the possibility of utilizing the superposing gear system as a reducing gear, acting via the adjustable hydraulic transmission, for the forward and reverse motion of the vehicle.

Figure 3:
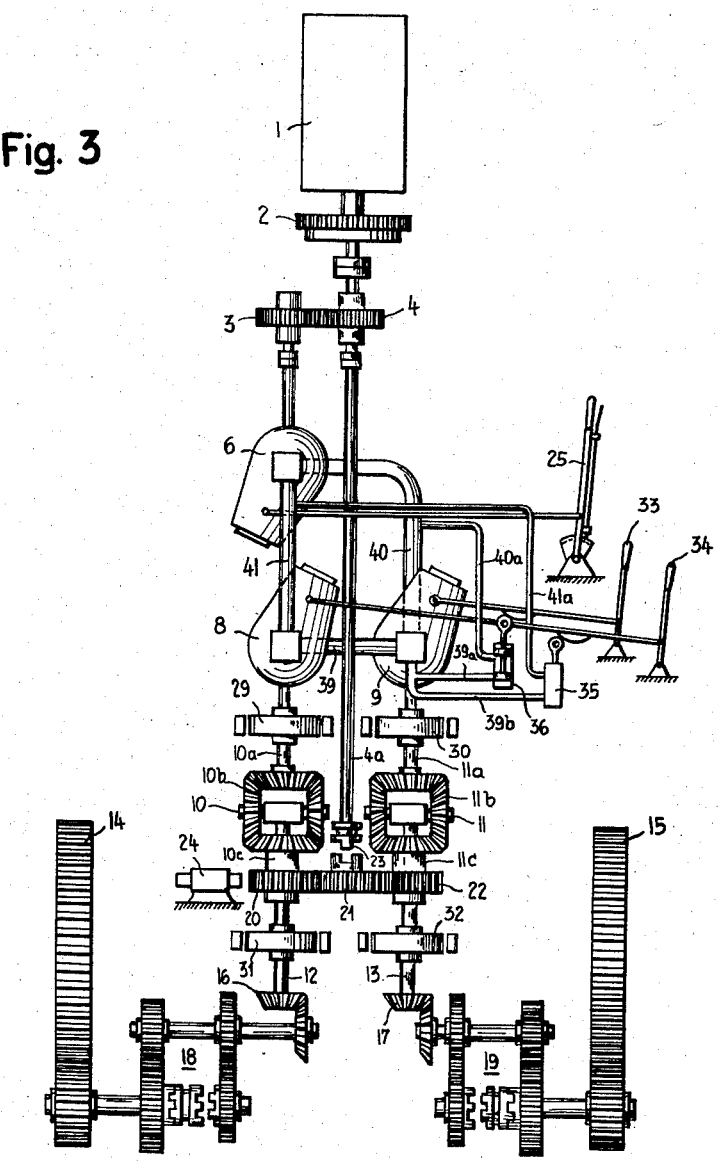
Fig. 3 is a similar view of a third type of drive mechanism according to the invention.

Fig. 1 supposes the existence of two completely separate hydrostatic transmissions; by connecting the secondary parts 8 and 9 in series with one another, however, a similar effect can also be achieved with a single primary drive which is generally adjustable and is common to both secondary drives. Such an arrangement is shown in Fig. 3. The hydraulic series connection of the secondary parts 8 and 9 is effected by conduits 39, 40, and 41. Speed changing can then be effected by adjusting the primary part, e. g. 6, by means of speed gear lever 25, possibly also by setting a partial stroke of the secondary parts 8 and 9 via the levers 33 and 34. The vehicle, or the secondary parts, can be reversed by swivelling the primary part to the other side, both secondary parts moving in reverse. In order, however, to make the secondary parts run counter to one another, as is required for steering the vehicle, one of the said parts would have to be swivelled through its zero position to the other side; in order that no troublesome speed increases or breakdowns should occur in the vicinity of small stroke settings, the said secondary part must be shortcircuited in the vicinity of its central position, which is done by the slide valves 35 or 36 via conduits 41a, 39b or 40a, 39a, respectively. In some cases such simplified embodiments of the invention are a practical way of utilizing the usual superposing gears 10, 11 for speed changing and steering.

For reasons of space hydraulic transmissions of the axial piston types are advantageous for the purposes described. These transmissions, however, are relatively sensitive to shocks if they are equipped with universal joints. This characteristic of a gear design which is otherwise very advantageous, is particularly apparent when the secondary parts are working in conjunction with a superposing drive because, here, the main proportion of the output is transmitted from the drive motor via the relatively rigid shafts and gear wheels to the track chain drives. For this reason, all shocks must be absorbed by the hydraulic driving mechanism which is always somewhat flexible owing to the nature of the hydraulic gear. The effect is that with this drive, which operates purely hydraulically and without any superposing gears, the shocks to be absorbed are particularly heavy. This difficulty can be eliminated by using the known, but hitherto seldom used axial piston type hydraulic transmissions without universal joints, in particular those in which the cylinder block and driving ring or driving pulley are connected by the piston rods, the latter bearing for instance against the inner cylinder wall and thus taking over the shocks jointly. This, owing to the plurality of piston rods necessary for other reasons, results in an extremely sturdy coupling of these two parts which is insensitive to shocks and oscillations.

Thus, it will be seen that there has been provided, in accordance with the invention, a combined speed-changing and steering arrangement for vehicles having tracks, drive means including a drive shaft for actuating said tracks, steering means for controlling the direction of movement of said vehicle, and speed control means for regulating the speed of movement of said vehicle, comprising differential gear means operatively connected to said tracks, hydraulic transmission means adjustably interconnected between said drive shaft and said differential gear means, first means pivotally interconnecting said steering means and a first portion of said speed control means with said hydraulic transmission means for adjustment of the latter independently by said first portion of said speed control means and by said steering means, and second means pivotally interconnecting a second portion of said speed control means with said hydraulic transmission means for adjustment of the latter by said second portion of said speed control means independently of said steering means and of said first portion of said speed control means, whereby said transmission means and said differential gear means function jointly in steering and changing the speed of said vehicle.

Various changes and modifications may be made without departing from the spirit and scope of the present invention and it is intended that such obvious changes and modifications be embraced by the annexed claims.

Having thus described the invention, what is claimed as new and desired to be secured by Letters Patent, is:

1. A combined speed-changing and steering arrangement for a vehicle having tracks; comprising drive means, constant ratio transmission means in driven connection with said drive means, variable ratio transmission means in driven connection with a respective track and in driven connection with said drive means, differential gear means for each track, each of said differential gear means having three shafts, the first of said shafts being in rotatably driven engagement with said constant ratio transmission means, the second of said shafts being in rotatably driven engagement with said variable ratio transmission means associated therewith, the third shaft being in driving engagement with the respective track, first actuating means operatively connected with each of said variable ratio transmission means and adapted to effect a ratio variation of equal magnitude and equal direction for each of said variable ratio transmission means, second actuating means operatively connected to each of said variable ratio transmission means and adapted to effect a ratio variation of different magnitude and different direction for each of said variable ratio transmission means, clutch means interposed between said constant ratio transmission means and said drive means for directly connecting the latter to said constant ratio transmission means, and respective means engageable with said second and third shaft, respectively, for braking said second and third shafts.

2. A combined speed-changing and steering arrangement for a vehicle having tracks; comprising drive means, constant ratio transmission means adapted for driven connection with said drive means, respective variable ratio transmission means in driving connection with a respective track and in driven connection with said drive means, differential gear means for each track, each of said differential gear means having three shafts, the first of said shafts being in rotatably driven engagement with said constant ratio transmission means, the second of said shafts being in rotatably driven engagement with said variable ratio transmission means, the third of said shafts being in driving engagement with the respective track, and respective actuating means operatively connected with each of said variable ratio transmission means and permitting to effect ratio variations of equal magnitude and of different magnitude, respectively, in each of said variable ratio transmission means, whereby said tracks may be driven simultaneously through both said variable ratio transmission means and said constant ratio transmission means during speed-changing as well as during steering.

3. An arrangement according to claim 2, one of said actuating means being speed change actuating means operatively connected with said variable ratio transmission means to thereby effect a ratio variation of equal magnitude and equal direction in each of said variable ratio transmission means, the other of said actuating means being steering actuating means operatively connected to said variable ratio transmission means to thereby effect a ratio variation of different magnitude and different direction in each of said variable transmission means, whereby the speed of the respective tracks may be varied for speed changing and steering of the vehicle.

4. An arrangement according to claim 3, including respective brake means engageable with each of said second and third shafts to thereby effectuate action of said variable ratio transmission means for vehicle speed-changing and steering.

5. A combined speed-changing and steering arrangement for a vehicle having tracks; comprising drive means, constant ratio transmission means in driven connection with said drive means, respective variable ratio transmission means in driving connection with a respective track and in driven connection with said drive means, differential gear means for each track, each of said differential gear means having three shafts, the first of said shafts being in rotatably driven engagement with said constant ratio transmission means, the second of said shafts being in rotatably driven engagement with said variable transmission means, the third of said shafts being in driving engagement with the respective track, first actuating means operatively connected with each of said variable ratio transmission means and adapted to effect a ratio variation of equal magnitude and equal direction for each of said variable ratio transmission means, second actuating means operatively connected to each of said variable ratio transmission means and adapted to effect a ratio variation of different magnitude and different direction for each of said variable ratio transmission means, clutch means interposed between said constant ratio transmission means and said drive means for connecting the latter directly to and disconnecting same from said constant ratio transmission means, and means engageable with said constant ratio transmission means for braking the same and said first shafts upon disconnection of said constant ratio transmission means from said drive means, to thereby drive said tracks solely through said variable ratio transmission means and said second and third shafts of said differential gear means.

6. A combined speed-changing and steering arrangement for a vehicle having tracks; comprising drive means, constant ratio transmission means in driven connection with said drive means, variable ratio transmission means including variable displacement hydraulic pump means in driven connection with said drive means and respective variable displacement hydraulic motor means for each of said tracks and hydraulically connected in series with said pump means, differential gear means for each track, each of said differential gear means having three shafts, the first of said shafts being in rotatably driven engagement with said constant ratio transmission means, the second of said shafts being in rotatably driven engagement with the respective one of said motor means of said variable ratio transmission means, the third shaft being in driving engagement with the respective track, speed-change actuating means operatively connected with said pump means for varying the displacement thereof, to thereby effect a ratio variation of equal magnitude and equal direction for each of said tracks over said respective motor means of said variable ratio transmission means, and steering actuating means operatively connected to each of said motor means for individually varying the displacements thereof, to thereby effect a ratio variation of different magnitude and different direction for each of said tracks.

References Cited in the file of this patent

UNITED STATES PATENTS

| | | |
|---|---|---|
| 1,307,819 | Janney | June 24, 1919 |
| 2,025,513 | Johnston | Dec. 24, 1935 |
| 2,336,911 | Zimmerman | Dec. 14, 1943 |
| 2,336,912 | Zimmerman | Dec. 14, 1943 |
| 2,393,557 | Orshansky, Jr. | Jan. 22, 1946 |
| 2,580,946 | Orshansky, Jr. | Jan. 1, 1952 |

FOREIGN PATENTS

| | | |
|---|---|---|
| 212,693 | Great Britain | Mar. 20, 1924 |